United States Patent [19]

Parulski et al.

[11] Patent Number: 5,428,456
[45] Date of Patent: Jun. 27, 1995

[54] METHOD AND APPARATUS FOR ADAPTIVELY REDUCING INTERLINE FLICKER OF TV-DISPLAYED IMAGE

[75] Inventors: Kenneth A. Parulski, Rochester; Michael S. Axman, West Henrietta, both of N.Y.

[73] Assignee: Eastman Kodak Company, Rochester, N.Y.

[21] Appl. No.: 669,832

[22] Filed: Mar. 15, 1991

[51] Int. Cl.⁶ .............................................. H04N 5/93
[52] U.S. Cl. .................................... 358/340; 358/335; 358/346
[58] Field of Search ................. 358/335, 214, 340, 36, 358/167, 244, 345, 346, 342; 360/33.1, 35.1; 348/447; H04N 5/93

[56] References Cited

U.S. PATENT DOCUMENTS

| | | | |
|---|---|---|---|
| 4,272,787 | 6/1981 | Michel et al. | 348/447 |
| 4,573,035 | 2/1986 | Dolazza | 358/167 |
| 4,626,910 | 12/1986 | Kawamura | 360/11.1 |
| 4,635,112 | 1/1987 | Tomioka et al. | 360/33.1 |
| 4,825,289 | 4/1989 | Ohta | 358/36 |
| 4,914,523 | 4/1990 | Manuta | 358/310 |
| 4,985,784 | 1/1991 | Tsuboi et al. | 358/335 |
| 5,019,904 | 5/1991 | Campbell | 348/447 |
| 5,053,879 | 10/1991 | Kubota | 358/244 |
| 5,121,271 | 6/1992 | Schear | 358/332 |
| 5,132,795 | 7/1992 | Campbell | 358/167 |
| 5,136,385 | 8/1992 | Campbell | 358/167 |
| 5,138,503 | 8/1992 | Nishida | 360/35.1 |
| 5,270,831 | 12/1993 | Parulski et al. | 358/403 |

Primary Examiner—Tommy P. Chin
Assistant Examiner—Huy Nguyen
Attorney, Agent, or Firm—David M. Woods

[57] ABSTRACT

An image analysis and flicker filter control mechanism is incorporated into the image processing software of a photofinishing workstation for the purpose of analyzing the high frequency content of the image. As a result of this analysis, there is stored on a write once optical compact disc, in the header field associated with each image, an interlace "flicker code" representative of the extent, if any, to which the vertical dimension of the image is to be subjected to a low pass filtering operation in the course of reading out the image from the disc for application to a playback device, such as a raster scan TV display. The flicker code may be a binary value code or a multiple bit value controls the degree of vertical lowpass filtering of only those images which exhibit interlace flicker, and only during playback onto interlaced TV displays, thereby reducing the flicker of an image reproduced by an interlaced TV display without reducing print sharpness.

31 Claims, 7 Drawing Sheets

INTERLACED-SCANNING PATTERN (RASTER)

METHOD AND APPARATUS FOR ADAPTIVELY REDUCING INTERLINE FLICKER OF TV-DISPLAYED IMAGE

FIELD OF THE INVENTION

The present invention relates to digitized image processing systems and to a vertical low pass filter mechanism which controllably reduces "interlace flicker" in the video display of an image accessed from a digital database. In particular, the present invention is directed to a technique for determining whether or not an image contains significant vertical detail of the type that would cause interlace flicker, and then controllably filtering only those images which require filtering, without reducing the sharpness of the images which do not exhibit interlace flicker during TV display, and without reducing the sharpness of any printed image.

BACKGROUND OF THE INVENTION

Figure 1:
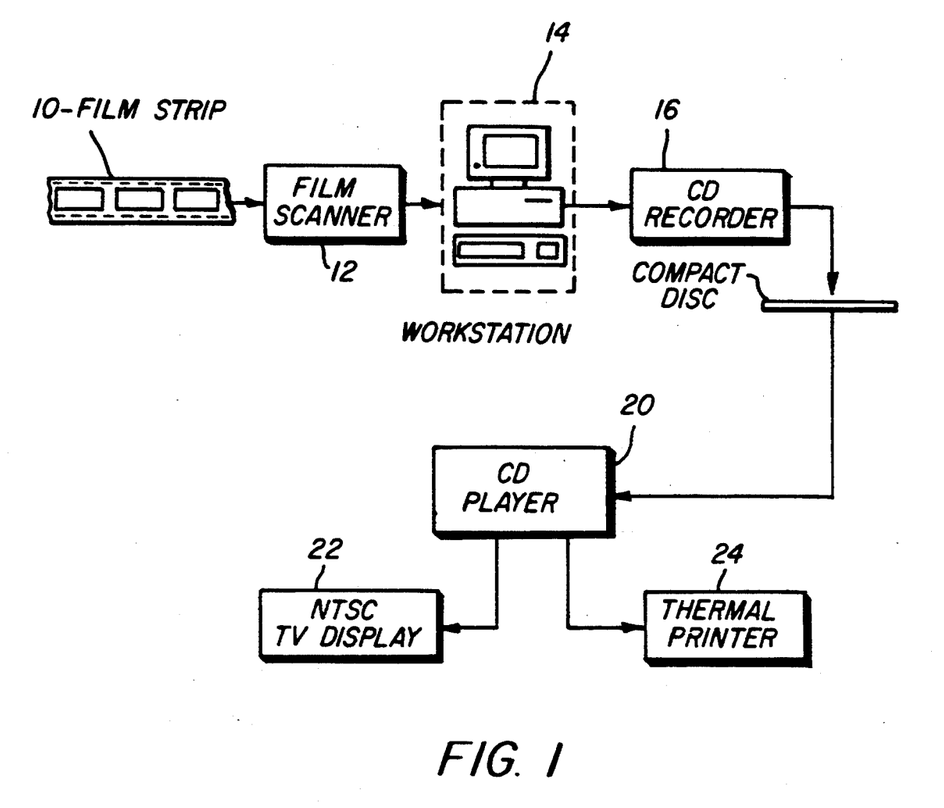
FIG. 1 diagrammatically illustrates a digital image processing system described in co-pending patent application Ser. No. 582,305, filed Sep. 14, 1990, by S. Kristy, entitled "Multiresolution Digital Imagery Photofinishing System;"

Digital imaging systems, such as those employed for converting still color photographic film (e.g. 35 mm) images into digital format for storage in a digital database and subsequent playback, as by way of a color television monitor, customarily encode the output of an opto-electronic film scanning device to some prescribed resolution and store the encoded image in an associated database as a respective image file. When it is desired to display a particular stored image, the contents of the respective addresses of the database in which the digitized image has been stored are read out and coupled to display driver circuitry for energizing corresponding pixels on the TV monitor. One such system, diagrammatically illustrated in FIG. 1, is described in co-pending patent application Ser. No. 582,305, filed Sep. 14, 1990, by S. Kristy, entitled "Multiresolution Digital Imagery Photofinishing System," assigned to the assignee of the present application and the disclosure of which is incorporated herein. As detailed in that application, photographic images, such as a set of twenty-four or thirty-six 24 mm×36 mm image frames of a 35 mm film strip 10, are scanned by a high resolution opto-electronic film scanner 12, such as a commercially available Eikonix Model 1435 scanner. Scanner 12 outputs digitally encoded data (e.g. a 2048×3072 pixel matrix) representative of the internal electronic scanning of a high resolution image sensing array onto which a respective photographic image frame of film strip 10 is projected. This digitally encoded data, or 'digitized' image, is coupled in the form of an imaging pixel array-representative bit map to an attendant image processing (photofinishing) workstation 14, which contains a frame store and image processing application software through which the digitized image may be processed (e.g. enlarged, rotated, cropped, subjected to scene balance correction, etc.) to achieve a desired image appearance. Once an image file has been prepared, it is stored on a transportable medium, such as a write-once optical compact disc, using an optical compact disc recorder 16, for subsequent playback by a disc player 20, which allows the image to be displayed, for example, on a relatively moderate resolution consumer television set 22 (e.g. having an NTSC display containing and array of 485 lines by 640 pixels per line), or printed as a finished color print, using a high resolution thermal color printer 24.

In the system described in the Kristy application, each high resolution captured image is preferably stored as a respective image data file containing a low, or base, resolution image bit map file and a plurality of higher resolution residual image files associated with respectively increasing degrees of image resolution. By iteratively combining the higher resolution residual image file data with the base resolution bit map image, successively increased resolution images may be recovered from the base resolution image for application to a reproduction device, such as a color monitor (raster type television display) or hard copy printer.

As an example, spatial data values representative of a high resolution 2048×3072 (2K×3K) image scan of a 24 mm-by-36 mm image frame of a 35 mm film strip 10 may be stored as a respective image data file including a base resolution image bit map file containing data values associated with a spatial image array of 512 rows and 768 columns of pixels and an associated set of residual image files to be stored on the disc. Within the workstation itself, the base resolution image may be further subsampled to derive an even lower resolution sub-array of image values (e.g. on the order of 128×192 pixels) for display on a segment of the system operator's workstation for the purpose of identifying image orientation and specifying aspect ratio.

In accordance with an invention described in co-pending patent application Ser. No. 583,265, filed Sep. 14, 1990 by K. Parulski et al, entitled "Mechanism for Controlling Presentation of Displayed Image," assigned to the assignee of the present application and the disclosure of which is incorporated herein, advantage is taken of the information storage capability of an optical compact disc to include on the disc additional presentation control files for each stored image which specifies how the image was captured on film and has been correspondingly digitized and stored on the disc. As a result, when eventually played back, as by way of a high resolution printer or TV display, the image will have an upright orientation and the correct aspect ratio for the display device.

Each image is digitized as though it were horizontally oriented. The digitized image is stored 'as is' in the workstation's frame store, and a lower resolution version of the digitized image is displayed on the display monitor of workstation 14, so that the image may be viewed by the operator (photofinisher). As each image is digitized and stored, the system operator, using a workstation input device (e.g. a keyboard or mouse) enters a set of 'presentation' control codes that are incorporated within a presentation control file associated with each respective image file, which define how the image was captured on film and has been correspondingly digitized and stored on the disc.

Figure 2:
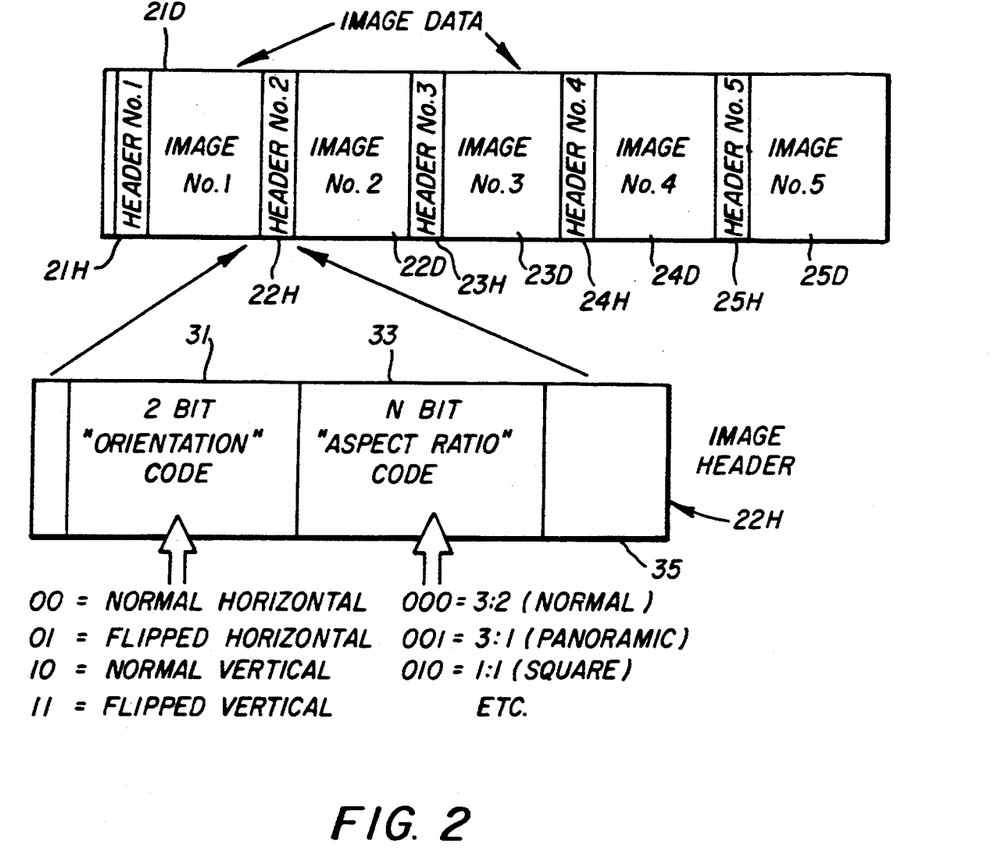
FIG. 2 shows the format of a presentation control file.

The format of a presentation control file, such as header file 22H associated with image data file 22D, into which normal vertical image frame 22 on film strip 10 has been digitized by scanner 12, is shown in FIG. 2 as comprising an orientation filed 31, an aspect ratio field 33 and a supplemental field 35, in which additional information, such as title, date, etc. may be inserted by the operator in the course of formatting a digitized image for storage on the disc. When the stored image is read from the disc by a playback device, such as an optical compact disc player coupled with a color TV monitor, it reads the presentation control file and causes the played back image to have an upright orientation and the correct aspect ratio for the display device.

Figure 3:
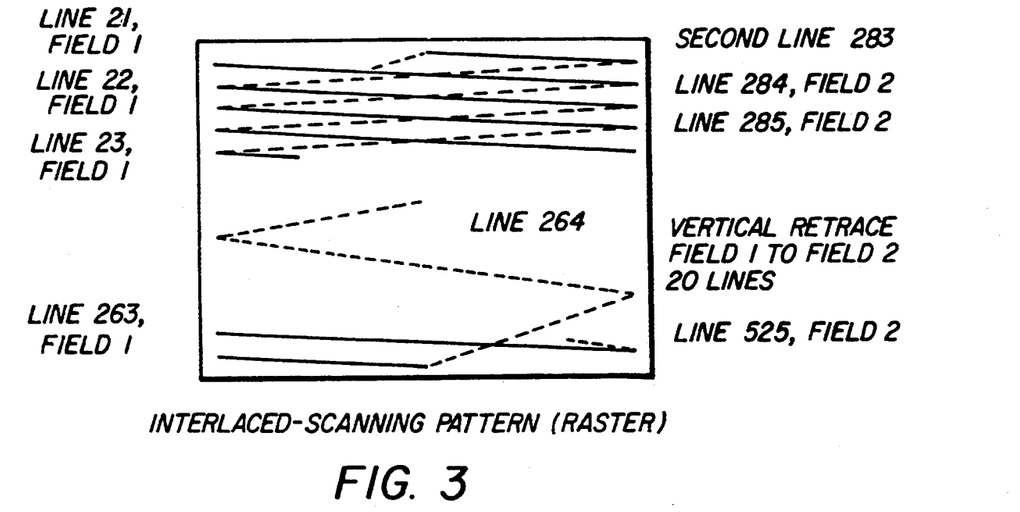
FIG. 3 shows the interlace scanning used in a conventional display.

Because the video resolution images are decimated versions of high resolution image records from the 35 mm film, the video images can contain more detail than can be displayed using a conventional TV display, reproduction signals for which typically originate with NTSC or PAL format video cameras. Indeed, the 35 mm color film images processed in accordance with the Kristy and Parulski et al systems can be expected to contain a much greater amount of vertical high spatial frequencies than conventional TV images. This additional vertical high spatial frequency content can cause a raster scan display artifact known as "interlace flicker", where the vertical edge details (from sharp horizontal lines, for example) will flicker visibly at a 30 Hz rate on normal interlaced NTSC displays. This interlace flicker occurs because the TV monitor displays every other line of the image during the first 1/60 second field time, and then displays the lines in between during the next 1/60 second field time, as shown in FIG. 3. In regions of an image having significant vertical detail, the lines of the first field will be quite different from the lines of the second field, so these regions of the image will appear to flicker at a 30 Hz rate. The amount of interlace flicker in an image depends on the image content and the way in which the image was photographed.

Interlace flicker can be reduced by lowpass filtering the image in the vertical direction, namely in a direction effectively transverse to the raster scan direction, thus reducing the vertical sharpness of the image. If the image is filtered in this way before it is written to the compact optical disc, the interlace flicker of the TV display can be reduced. Unfortunately, the filter will also reduce the sharpness of color prints made from the digitized images that have been stored on the optical compact disc. Additionally, the quality of the displayed TV images of pictures which were not sharply focused, or those of subjects which do not include significant vertical detail, and therefore will not cause interlace flicker if applied to a TV display, will be reduced without any attendant benefit.

SUMMARY OF THE INVENTION

In accordance with the present invention, this problem is solved by means of an image analysis and flicker filter control mechanism which provides vertical lowpass filtering of only those images which exhibit interlace flicker, and only during playback onto interlaced TV displays, thereby reducing the flicker of an image reproduced by an interlaced TV display without reducing print sharpness.

For this purpose, the mechanism in accordance with the invention is incorporated into the image processing software of a photofinishing workstation for the purpose of analyzing the high frequency content of the image. As a result of this analysis, there is stored on the disc, in the header field associated with each image, an interlace "flicker code" representative of the extent, if any, to which the vertical dimension of the image is to be subjected to a low pass filtering operation in the course of reading out the image from the disc for application to a playback device, such as a raster scan TV display. The header field may also include orientation and aspect ratio information as described in the above referenced Parulski et al application. The flicker code may be a binary value code, where, for example "0" indicates that the image will not exhibit significant interlace flicker and the flicker filter should not be used for this image, and "1" indicates that the image will exhibit significant interlace flicker and the flicker filter should be enabled for this image. Alternately, the flicker code may be a multiple bit value which is used to select between a multiplicity of different flicker filter characteristics.

DETAILED DESCRIPTION

Before describing in detail the particular improved mechanism for adaptively reducing the interline flicker of a TV-displayed in accordance with the present invention, it should be observed that the present invention resides primarily in a novel structural combination of conventional signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 4:
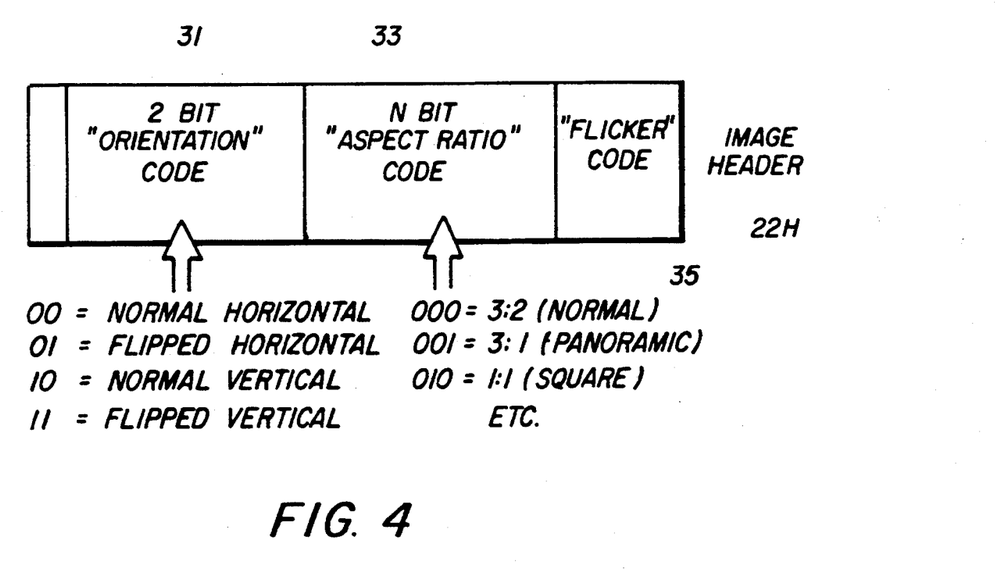
FIG. 4 shows a presentation field in which a supplemental field 35 contains a "flicker" code.

As pointed out above with reference to FIG. 2, the format of a presentation control file employed in the image presentation control mechanism described in the co-pending Parulski et al application contains a header file associated with the image data file. The header file typically comprises an orientation filed 31, an aspect ratio field 33 and a supplemental field 35, in which additional information, such as title, date, etc. may be inserted by the operator in the course of formatting a digitized image for storage on the disc. In accordance with the present invention, supplemental field 35 contains what will hereinafter be referred to as a "flicker" code, as shown in FIG. 4. In a first embodiment of the invention, the flicker code may be a binary code, where a "0" for example indicates that the stored image will not cause significant interlace flicker when played back on a raster scan display device, so that vertical filtering of the image should not be carried out, while a "1" indicates that the image will exhibit significant interlace flicker and the flicker filter should be enabled for this image. In a second embodiment, the flicker code is a multiple bit value which is used to select from among a multiplicity of different flicker filter characteristics.

Figure 5:
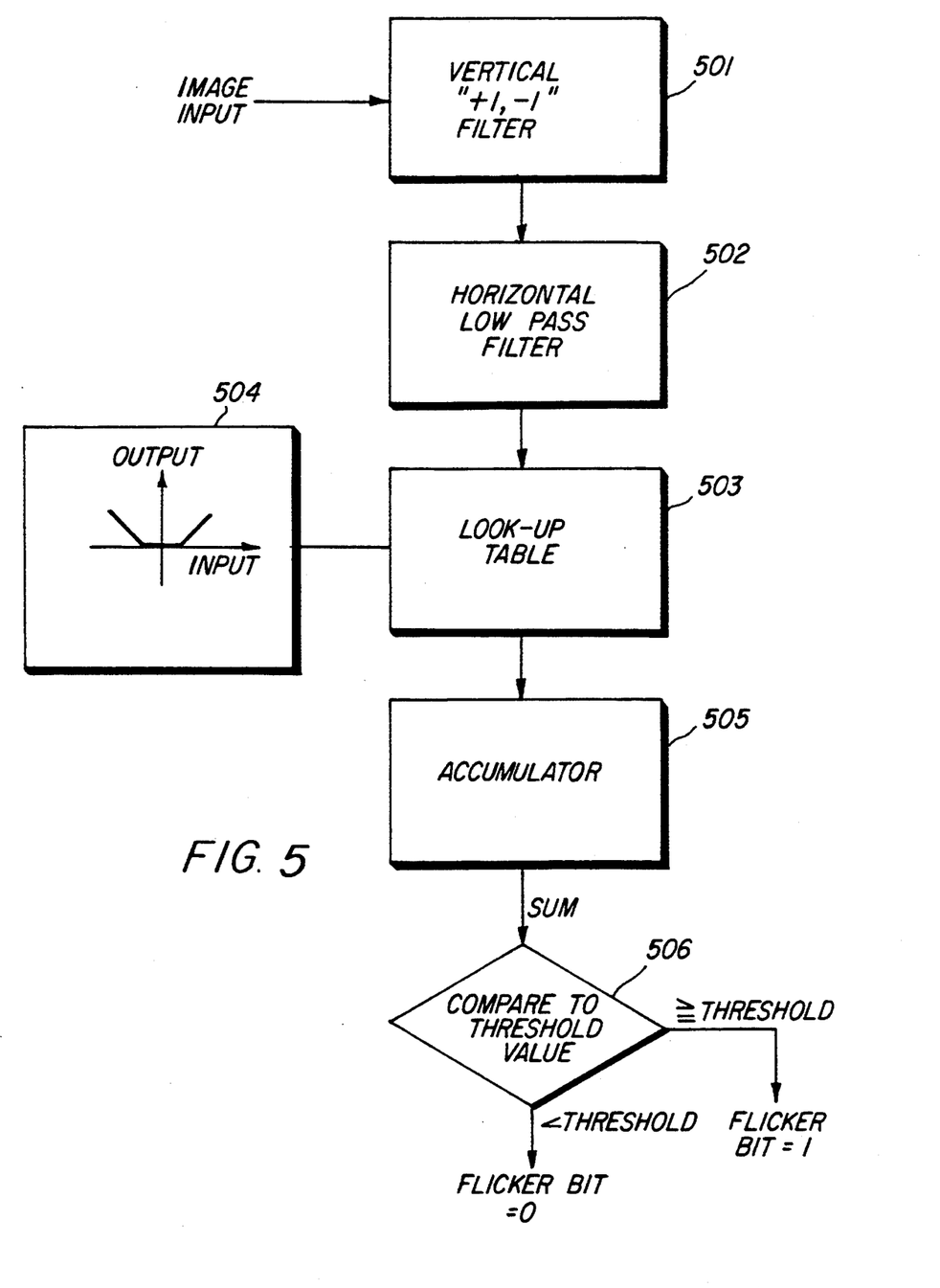
FIG. 5 shows a mechanism for determining the binary value (0 or 1) of the flicker code of the first embodiment of the invention.

FIG. 5 shows a mechanism for determining the binary value (0 or 1) of the flicker code of the first embodiment of the invention using the workstation 14 of the photofinishing system shown in FIG. 1. While the input image is preferably a video resolution (512 line) image, the application of the invention is not limited to this or any other resolution image, and the invention may be applied, for example, to the full resolution (2048 line) digitized image obtained by high resolution film scanner 12.

As shown in FIG. 5, a digitized image accessed from the digital storage medium, such as a write once optical compact disc, is high pass filtered in the vertical direction using a "−1, +1" filter (STEP 501), through which the digital image value of the pixel immediately above a respective pixel of interest is subtracted from the digital image value of the respective pixel. In STEP 502, this vertically high pass filtered digitized image is next low pass filtered in the horizontal direction (parallel to the horizontal line direction of a normal TV raster scan), in order to ensure that the horizontal dimension of an area of the image containing vertical detail is not insubstantial, since only such an area will cause significant flicker.

In STEP 503, the resulting horizontally low pass filtered image is then applied to a low level clipping lookup table, having a transfer function diagrammatically illustrated at 504. This function clips low level vertical details to zero, since such low level signals do not cause significant flicker, and takes the absolute value of larger signals. Next, in an Accumulator STEP 505, a running total of the result of the clip and absolute value operation derived in STEP 503 is maintained for the pixels of every second line in the image.

After the entitle image has been processed through STEP 505, the accumulator sum is compared to a threshold value, in query STEP 506. If the sum is equal to or greater than the threshold, the flicker bit value is set equal to "1," indicating that the interlace flicker filter should be used in the playback device. If the sum is less than the threshold, the flicker bit value is set equal to "0," indicating that the interlace flicker filter is to be bypassed.

Figure 6:
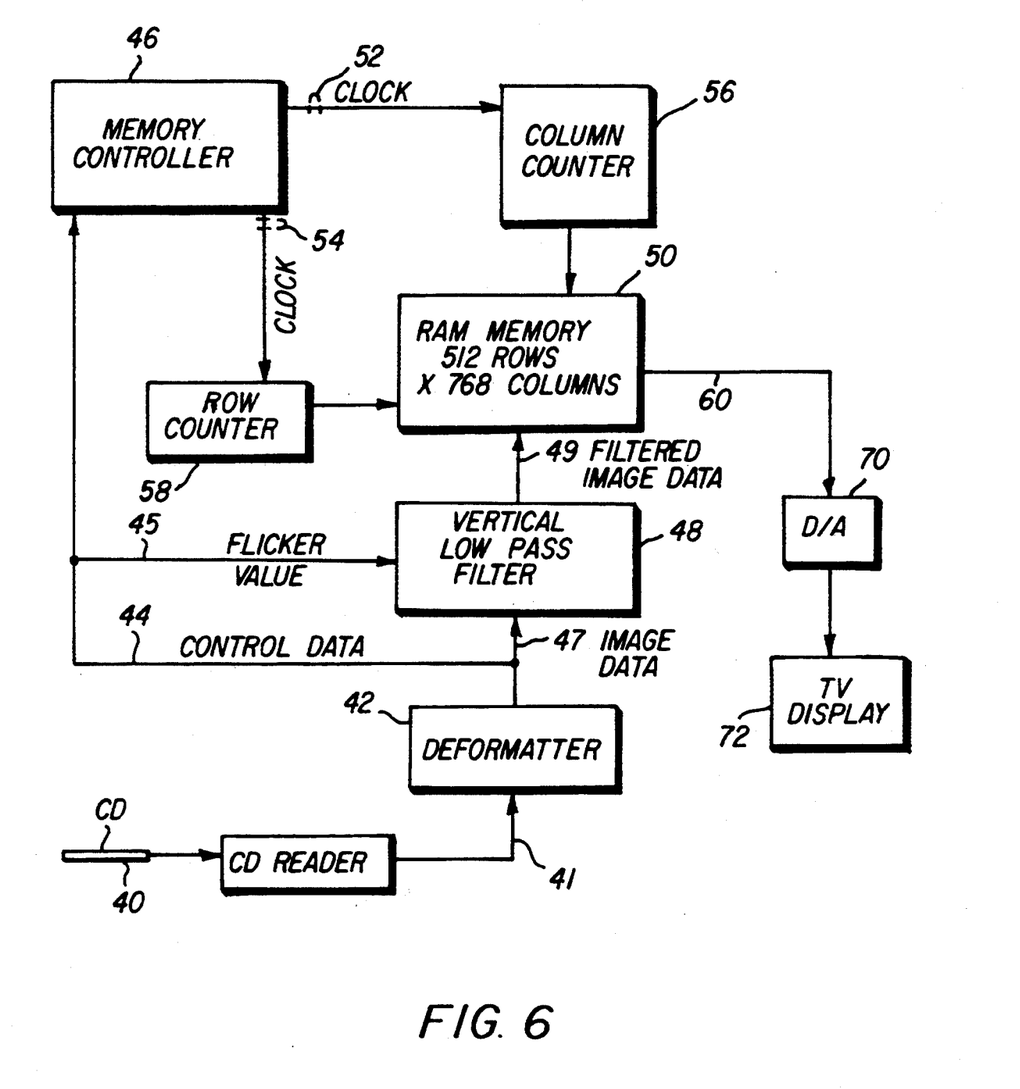
FIG. 6 diagrammatically illustrates a modification of the signal processing architecture of an image retrieval mechanism in which a selectively enabled vertical low pass filter is incorporated upstream of the storage of incoming digitized image data in the playback device's image memory.

FIG. 6 diagrammatically illustrates a modification of the signal processing architecture of the image retrieval mechanism described in the above referenced Parulski et al application in which a selectively enabled vertical low pass filter is incorporated upstream of the storage of incoming digitized image data in the playback device's image memory. As shown in FIG. 6, data read from an optical disc 40 is coupled over input bus 41 to a deformatter 42, which separates the control data (the header field) from the (512×768) pixel representative image data. The header data is coupled over link 44 to a memory controller 46 and over a link 45 to a controllable vertical low pass filter 48. The deformatted image data is coupled over link 47 to filter 48. The output of filter 48 is coupled over link 49 to a random access memory 50. The storage capacity of memory 50 corresponds to the size of the base resolution image (512×768 pixels) stored on the disc.

As described in the Parulski et al application, memory read out controller 46 may be incorporated as part of the CD player's microcontroller or may be a separate dedicated combinational logic circuit driven by the microcontroller for controlling the generation of read out address/clock signals which are supplied over respective address bus links 52 and 54 to a set of associated column and address counters 56 and 58, respectively, for controlling the rate and order in which contents of memory 50 are accessed.

Each field of image data for a respective digitized image is formatted as though the image is a normal horizontal image and, when downloaded from the disc into memory 50, the image data is simply written directly into memory 50 in this format. The manner in which the image is read out from memory 50 in accordance with the contents of its associated header field determines the orientation and display of the image on an associated display device (TV monitor). When image data is read out from memory 50, it is coupled over link 60 to a digital-to-analog converter 70 for application to a display device, such as a color TV monitor, so that a reproduction of the original 35 mm film image will be presented to the viewer.

In accordance with the operation of the architecture of FIG. 6, a low resolution version of the image, typically having about 512×768 luminance pixels, is read from compact disc 40 at a relatively slow speed and stored in a RAM framestore 50. The stored image is then clocked from memory at a much higher speed, converted from digital to analog form, and fed to TV display 72. To eliminate the interlace flicker, a vertical low pass filter 48 processes the image data 47 before it is stored in memory 50. For this purpose, the vertical low pass filter may be implemented using cascaded line delays configuration shown in FIG. 7. Specifically, image data read from disc 40 is delayed in two cascaded line delays 81 and 82, thereby producing three vertically adjacent pixel values on lines 47, 91 and 93. The data values on these lines are respectively multiplied by three filter coefficients $a_{-1}$, $a_0$ and $a_{+1}$ in multipliers 101, 103 and 105. Typical values for the filter coefficients are $a_{-1}=0.25$, $a_0=0.5$, and $a_{+1}=0.25$. The multiplier outputs are then summed in adder 107, to provide a vertically lowpass filtered value of the image data signal 48. Output multiplexer 111 has data inputs coupled to the output of line delay 81 and the output of adder 107. Output multiplexer 111 has a select input coupled to control link 45. As noted above, when the (binary) flicker value equals "1", multiplexer 111 couples the sum output from adder 107 as the filtered image data to memory 50. When the flicker value equals "0", multiplexer 111 couples the unfiltered but delayed value from line delay 81.

Figure 8:
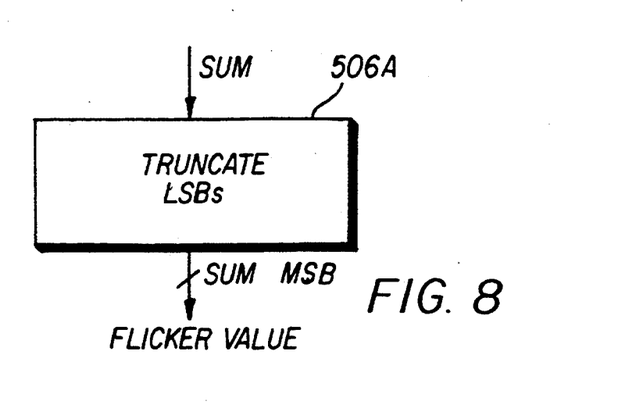
FIG. 8 shows a first alternative replacement step for the comparison operation of FIG. 5.

As pointed out earlier, rather than use a single bit for filter control, the flicker code may have a multiple bit value which is used to select from among a multiplicity of different flicker filter characteristics. In this second embodiment of the invention, a multi-bit flicker code value may be generated by using the MSBs of the summation value obtained from the accumulation operation (STEP 505, FIG. 5), or by replacing the single threshold comparison operation (STEP 506, FIG. 5) with a series of comparison operations. FIG. 8 shows a first alternative replacement step for the comparison operation of FIG. 5, in which STEP 506 is replaced by STEP 506A, wherein a preselected number of least significant bits of the accumulation value are truncated, so that the flicker value is defined by the remaining most significant bits.

Figure 9:
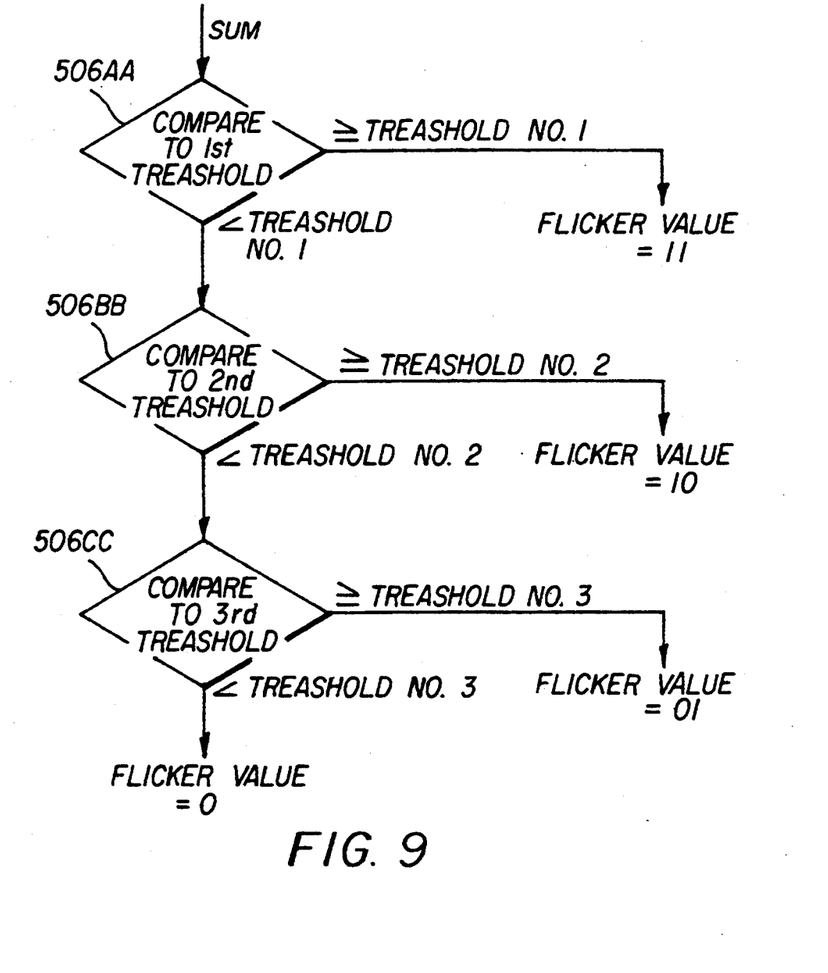
FIG. 9 shows a second alternative replacement step for the comparison operation of FIG. 5.

Similarly, FIG. 9 shows a second alternative replacement step for the comparison operation of FIG. 5, in which STEP 506 is replaced by the sequence of STEPS 506AA, 506BB and 506CC, wherein the accumulated sum is successively compared with respectively smaller threshold values to control the value of the multi-bit flicker code on link 45.

Figure 7:
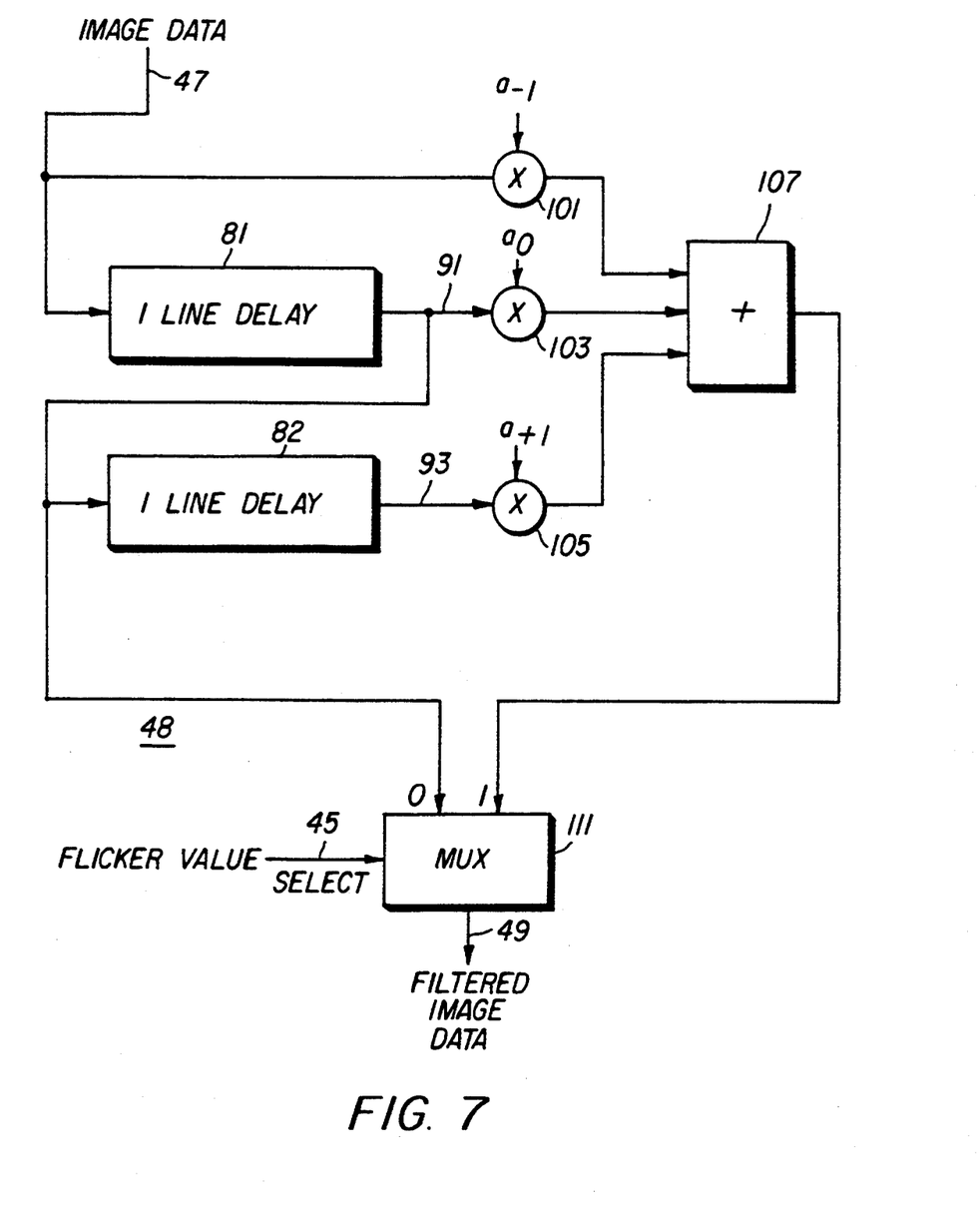
FIG. 7 shows an implementation of a vertical low pass filter using a cascaded line delay configuration.

The multi-bit code value obtained from either of the schemes shown in FIGS. 8 and 9 may be used to select between a number of choices for the filter coefficients $a_{-1}$, $a_0$ and $a_{+1}$ which are supplied to multipliers 101, 103 and 105 in FIG. 7. The values of the filter coefficients may be established to provide a greater degree of vertical low pass filtering for those images with the largest flicker values, and less filtering for those images with lower flicker values.

As will be appreciated from the foregoing description, the present invention employs an image analysis and flicker filter control mechanism that is incorporated into the image processing software of a photofinishing workstation for the purpose of analyzing the high frequency content of the image. As a result of this analysis, it is possible to store on the disc, in the header field associated with each image, an interlace "flicker code" representative of the extent, if any, to which the vertical dimension of the image is to be subjected to a low pass filtering operation in the course of reading out the image from the disc for application to a playback device, such as a raster scan TV display. The flicker code may be a binary value code or a multiple bit value which controls the degree of vertical lowpass filtering of only those images which exhibit interlace flicker, and only during playback onto interlaced TV displays, thereby reducing the flicker of an image reproduced by an interlaced TV display without reducing print sharpness. In addition to controllably performing low pass filtering in order to reduce interlace flicker during playback of an image on a TV display device, the image analysis and code generation mechanism of the present invention may be used to control image reproduction on other types of playback devices. For example, analysis of the high frequency content of the image may be used to produce a corresponding code which is used to control the operation of a playback device such as a printer, in order to adjust a prescribed reproduced image characteristic, such as performing edge enhancement.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a digitized image processing system in which images that have been captured on an image recording medium are converted into digital format and stored as digitized image data files on a digital data storage medium, a method of controlling the manner in which a digitized image is accessed from said digital storage medium for playback on an image reproduction device comprising the steps of:
   (a) analyzing said digitized image to determine whether or not said digitized image contains an amount of vertical high spatial frequency content that, when played back on a television raster scan type playback device as a displayed image, would cause the displayed image to contain a prescribed amount of interlace flicker in which vertical edge details flicker at the scanning rate of said television raster scan type playback device; and
   (b) storing on said digital data storage medium, a respective data file associated with an image that has been digitized from an image captured on said image recording medium, said respective data file containing digitized imagery data representative of its associated image as captured on said image recording medium; and
   (c) storing on said digital data storage medium, a control code the contents of which represent whether or not such digitized image, when played back on a television raster scan type playback device, would cause the displayed image to contain a prescribed amount of said interlace flicker based upon the analysis carried out in step (a).

2. A method according to claim 1, further comprising the steps of:
   (d) playing back said stored image data file from said digital data storage medium for display by a television raster scan type play back device;
   (e) controllably low pass filtering the vertical detail of said image in the course of playing back said stored image data file in dependence upon the contents of the control code stored in step (c).

3. A method according to claim 2, wherein step (e) comprises low pass filtering the vertical detail of said image in the course of playing back said stored image data file from said digital data storage medium in response to said control code having a first value, but otherwise coupling said stored image data file to said image playback device without low pass filtering the vertical detail of said played back image.

4. A method according to claim 1, wherein step (c) comprises storing a code representative of the amount of said interlace flicker expected to be generated in the course of playing back said stored image to said television type raster scan type playback device.

5. A method according to claim 4, further comprising the step of:
   (d) playing back said stored image data file from said digital data storage medium for display by a television raster scan type play back device;
   (e) controllably low pass filtering the vertical detail of said image in the course of playing back said stored image data file from said digital data storage medium for display by a television raster scan type playback device in dependence upon the contents of the control code stored in step (c).

6. For use with a digitized image processing system in which images that have been captured on an image recording medium are converted into digital format and stored as digitized image data files on a digital data storage medium, a method of controlling the manner in which a digitized image is processed during subsequent read out from said digital data storage medium comprising the steps of:

(a) analyzing the content of said image for the presence of high spatial frequency information in a prescribed dimension of said image transverse to a direction of scan of said image by a raster scan type of image playback device; and (b) storing, on said digital data storage medium, a respective data file associated with an image that has been digitized from an image captured on said image recording medium, said data file containing digitized imagery data representative of its associated image as captured on said image recording medium and a code representative of the amount of said high spatial frequency information in said prescribed dimension of said image.

7. A method according to claim 6, further comprising the steps of:

(c) playing back the digital image contained in said stored image data file from said digital data storage medium for display by an image playback device; and (d) processing said digitized image in the course of said playing back in step (c) in accordance with the contents of the code stored in step (b).

8. A method according to claim 7, wherein step (d) comprises controllably lowpass filtering the contents of said digitized image along said prescribed dimension thereof in accordance with the contents of the code stored in step (b).

9. A method according to claim 8, wherein step (d) comprises controlling the amount of lowpass filtering of the contents of said digitized image along said prescribed dimension thereof in accordance with the value of the code stored in step (b).

10. A method according to claim 7, wherein step (d) comprises lowpass filtering the contents of said digitized image along said prescribed dimension thereof in response to said stored code having a first predetermined value, but otherwise coupling the contents of said raster scan type of digitized image, absent lowpass filtering along said prescribed dimension thereof, to said image playback device.

11. A method according to claim 6, further comprising the steps of:

(c) providing a lowpass filter which controllably lowpass filters the contents of said digitized image along said prescribed dimension thereof in the course of reading out the digitized image data file stored on said digital data storage medium for playback by an image playback device; and (d) selectively enabling said lowpass filter to controllably lowpass filter the contents of said prescribed dimension of said digitized image in dependence upon the value of said code.

12. A method according to claim 11, wherein step (d) comprises enabling said lowpass filter to controllably lowpass filter the contents of said prescribed dimension of said image in response to said digitized image playback device being an interlaced raster scan type of television display device.

13. A method according to claim 12, wherein step (b) comprises storing a code representative of the amount of interlace flicker expected to be generated in the course of playing back said stored image data file to said television type raster scan type playback device.

14. A method according to claim 13, wherein step (d) comprises controlling the degree of lowpass filtering of the vertical detail of said played back image in the course of playing back said stored image data file from said digital data storage medium for display by said television raster scan type playback device, in dependence upon the value of said stored code.

15. For use with a digitized image processing system in which images that have been captured on an image recording medium are converted into digital format and stored as digitized image data files on a digital data storage medium and accessed therefrom for playback on a raster scan type of image reproduction device, a method of processing a respective one of said images for controlling the playback thereof on said raster scan type of image reproduction device comprising the steps of:

(a) highpass spatial filtering the contents of said respective one of said images along a vertical dimension thereof and producing, for successive line locations across the horizontal dimension of said respective one of said images, first signals representative of absolute values of the result of said highpass filtering;

(b) summing the first signals produced in step (a) to obtain a summation value;

(c) in response to the summation value obtained in step (b) having a predetermined relationship with respect to a threshold value, lowpass spatial filtering the vertical spatial detail of said respective one of said images in the course of playing back said stored image data file from said digital data storage medium, but otherwise coupling said stored image data file to said image playback device without low pass spatial filtering the vertical spatial detail of said respective one of said images during play back of said respective one of said images on said raster scan type of image reproduction device.

16. A method according to claim 15, wherein step (a) includes subjecting the result of said, highpass spatial filtering to a lookup table function which sets small values of said first signals to zero.

17. A method according to claim 15, wherein step (a) further includes the step of lowpass spatial filtering the results of said highpass spatial filtering along a horizontal dimension of said respective one of said images.

18. A method according to claim 15, wherein step (a) of highpass spatial filtering the contents of said respective one of said images along a vertical dimension thereof comprises deriving a difference value between the value of an image pixel immediately vertically displaced from an pixel of interest and the value of the image pixel of interest for successive lines of said respective one of said images.

19. For use with a digitized image processing system in which images that have been captured on an image recording medium are converted into digital format and stored as digitized image data files on a digital data storage medium, an apparatus for controlling the manner in which digitized images are accessed therefrom for presentation on an image reproduction device comprising, in combination:

a digitized image recording device including means for storing, on said digital data storage medium, respective data files associated with each of the images that have been digitized from images captured on said image recording medium, each of said data files containing digitized imagery data representative of its associated image as captured on said image recording medium, and a presentation file for each of said respective data files, the contents of said presentation file including a code representative of the amount of high frequency information in a prescribed dimension of a respective image; and a playback device including a digital data memory, and means for reading from said digital data storage medium the digitized imagery data of a respective data file and a controllable low pass filter which filters the contents of said prescribed dimension of said respective image in the course of writing the read out digitized imagery data into said digital data memory in accordance with the value of said code in its associated presentation file, and means for controllably reading out digitized imagery data that has been written into said memory and coupling the digitized imager, to an image reproduction device such that an output image is reproduced by said image reproduction device.

20. An apparatus according to claim 19, wherein said controllable lowpass filter performs low pass filtering of the vertical detail of said respective image in the course of playing back said stored image data file from said digital data storage medium in response to said control code having a first value, but otherwise writing said stored image data file to said digital data memory without low pass filtering the vertical detail of said respective image.

21. An apparatus according to claim 19, wherein said code is representative of the amount of interlace flicker expected to be generated in the course of playing back said stored image data file to said television type raster scan type playback device.

22. A method according to claim 21, wherein said controllable lowpass filter controls the degree of lowpass filtering of the vertical detail of said played back image in the course of writing said image to memory in dependence upon the value of said stored code.

23. For use with a digitized image processing system in which images that have been captured on an image recording medium are converted into digital format and stored as digitized image data files on a digital data storage medium, a system for controlling the manner in which a digitized image is processed during subsequent read out from said digital data storage medium comprising:

means for analyzing the content of said image for the presence of high spatial frequency information in a prescribed dimension of said image transfers to a direction of scan of said image by a raster scan type of image playback device; and recording means which stores, on said digital data storage medium a respective data file associated with an image that has been digitized from an image captured on said image recording medium, said data file containing digitized imagery data representative of its associated image as captured on said image recording medium and a code representative of the amount of said high spatial frequency information in said prescribed dimension of said image.

24. A system according to claim 23, further comprising:

playback means which plays back said stored image data file from said digital data storage medium for display by an image playback device and processes said displayed image in the course of said playing back in accordance with the contents of said stored code.

25. An apparatus according to claim 24, wherein said playback means includes means for controllably lowpass spatial filtering the contents of said image along said prescribed dimension thereof in accordance with the contents of said stored code.

26. An apparatus method according to claim 25, wherein said playback means includes means controlling the amount of lowpass spatial filtering of the contents of said image along said prescribed dimension thereof in accordance with the value of said stored code.

27. An apparatus according to claim 24, wherein said playback means includes a lowpass spatial filter which controllably lowpass spatial filters the contents of said image along said prescribed dimension thereof in response to said stored code having a first predetermined value, but otherwise couples the contents of said image, absent lowpass spatial filtering along said prescribed dimension thereof, to said memory.

28. An apparatus according to claim 24, wherein said playback means includes a lowpass spatial filter which controllably lowpass spatial filters the contents of said image along said prescribed dimension thereof in the course of reading out the digitized image stored on said digital data storage medium for playback by an image playback device, and means for selectively enabling said lowpass spatial filter to controllably lowpass spatial filter the contents of said prescribed dimension of said image in dependence upon the value of said stored code.

29. An apparatus according to claim 28, wherein said playback means is operative to enable said lowpass spatial filter to controllably lowpass spatial filter the contents of said prescribed dimension of said image in response to said image playback device being a raster scan type of television display device.

30. An apparatus according to claim 24, wherein said recording means comprises means for storing a code representative of the amount of interlace flicker expected to be generated in the course of playing back said stored image data file to said television type raster scan type playback device.

31. An apparatus according to claim 30, wherein said playback means includes means for controlling the degree of lowpass spatial filtering of the vertical detail of said played back image in the course of playing back said stored image data file from said digital data storage medium for display by said television raster scan type playback device, in dependence upon the value of said stored code.

* * * * *